(12) United States Patent
Lee et al.

(10) Patent No.: US 6,275,691 B1
(45) Date of Patent: Aug. 14, 2001

(54) METHOD FOR MANAGING DATA IN DIGITAL CELLULAR SYSTEM

(75) Inventors: Dong-Sun Lee; Young-Ki Jeon, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/032,633

(22) Filed: Feb. 27, 1998

(51) Int. Cl.⁷ .................................................. H04M 11/10
(52) U.S. Cl. ...................... 455/412; 455/424; 455/186.1
(58) Field of Search ............................ 395/828; 455/413, 455/433, 412, 561, 424; 707/100, 3, 201

(56) References Cited

U.S. PATENT DOCUMENTS

| | | | |
|---|---|---|---|
| 4,570,217 | * | 2/1986 | Allen et al. ........................ 364/188 |
| 5,212,806 | * | 5/1993 | Natarajan .......................... 455/33.2 |
| 5,410,753 | * | 4/1995 | Szabo ................................ 455/67.4 |
| 5,499,359 | * | 3/1996 | Vijaykumar ...................... 395/600 |
| 5,530,854 | * | 6/1996 | Emery et al. ..................... 395/600 |
| 5,608,854 | * | 3/1997 | Labedz et al. .................... 395/141 |
| 5,745,896 | * | 4/1998 | Vijaykumar ...................... 707/100 |
| 5,842,202 | * | 11/1998 | Kon .................................... 707/3 |
| 5,887,193 | * | 3/1999 | Takahashi et al. ............... 395/828 |
| 5,937,413 | * | 8/1999 | Hyun et al. ....................... 707/201 |

FOREIGN PATENT DOCUMENTS

| | | |
|---|---|---|
| 0820203 | 1/1998 | (EP) . |
| WO 9724662 | 7/1997 | (WO) . |

OTHER PUBLICATIONS

"An Introduction to Database Systems", published 1981, Addison–Wesley, pp. 65 and 135.

* cited by examiner

Primary Examiner—Daniel Hunter
Assistant Examiner—C. Chow
(74) Attorney, Agent, or Firm—Dilworth & Barrese, LLP

(57) ABSTRACT

A method for managing data in a maintenance system of a digital cellular system which provides for the simultaneous management (i.e., change, addition and removal) of a plurality of data via a unified man machine communication (MMC). The method includes steps such as requesting, by the unified MMC, changing, adding, removing and display operations of data contained in either a single tuple data list or data contained in a plurality of tuple data lists, reading data from a table that provides either the single tuple data list or the plurality of tuple data lists, and performing the changing, adding, removing and display operations of the data via the unified MMC.

6 Claims, 5 Drawing Sheets

METHOD FOR MANAGING DATA IN DIGITAL CELLULAR SYSTEM

BACKGROUND OF THE INVENTION

1. Field of the Invention

The present invention relates to a method for data management in a digital cellular system and, in particular, to a data management method in a base station manager (BSM) for managing a base station transceiver subsystem (BTS) and a base station controller (BSC) in a digital cellular system.

2. Description of the Related Art

In a conventional digital cellular system, a base station manager (BSM), (which is one element of base station manager subsystems) functions to maintain a base station transceiver subsystem (BTS) and a base station controller (BSC). The BSM utilizes a main frame work station having an output unit, a system console, a tape drive, and a hard disk drive (HDD). The output unit includes a printer for printing system maintenance information and an audio speaker for sounding a warning. The system console has an operator matching function and a system status output function. The tape drive and the hard disk drive store system information and data.

Conventionally, the BSM manages (i.e., changes, adds, and removes) data by the field unit. This conventional method for changing, adding and removing data is limited to one tuple per corresponding man machine communication (MMC). Thus, when adding and removing a plurality of tuple data lists (i.e., a table which is a congregation of a plurality of associated tuples), the BSM must repeat an adding MMC operation and a removing MMC operation for each tuple data list. Further, when changing a plurality of tuple data, the BSM must repeat a changing MMC operation for each tuple data.

A configuration of related data will be described below for a better understanding of the terms "field" and "tuple". In the relative data configuration, a general user recognizes the data in the form of a table comprising rows and columns. For convenience, the column is called the "field" or an "item", and the row is referred to as a "record". Further, a column representing one field is referred to as an "attribute", and a row representing one record is referred to as the "tuple".

Referring to FIG. 1, a flow chart for a conventional method in a BSM for managing (i.e., changing, adding, and removing) one tuple data list is shown. Conventionally, when an operator requests either a changing, adding or removing MMC operation with respect to certain data in a tuple data list, the BSM performs the changing, adding, or removing MMC operation with respect to the corresponding tuple data list (step 10). Next, the BSM performs an error check operation (step 12). Thereafter, the BSM performs the changing, addition, and removing operation with respect to the data in the corresponding tuple data list (step 14). The BSM then transfers the managed tuple data list to the BSC and the BTS (step 16). The BSM then updates the managed tuple data list into a database upon receiving an acknowledge signal from the BSC and the BTS (step 18). The results of the operation are then output by the BSM, for example, via a graphic user interface (GUI) (step 20).

This conventional data management method has several disadvantages. First, it is difficult to manage the data since the data is managed by the tuple and, therefore, every field must be independently managed when changing a whole tuple data list. Indeed, if the BSM was to simultaneously manage the data of several fields using the conventional method, confusion in the data management operation may occur.

Another disadvantage is that the MMC operation must be repeated. For example, in order to change (i.e., manage) the tuple data list in the sector unit of a neighboring cell during a hand-off operation, the operator must first check the tuple data list via a display MMC operation so as to check the details of the tuple data list that are changed. Thereafter, the operator must change data of the neighbor cell by performing the changing MMC operation, and then determine once again whether or not the data has been correctly changed by performing a display MMC operation. In other words, the operator must sequentially perform the following operations: a display MMC->the changing MMC->repeat the display MMC.

A further disadvantage of the conventional data management method is that it is difficult to manage the data when several tuples are interlocked (closely related) to one another by several tuple data lists units. For instance, if a tuple data list having a top priority is removed, all the remaining tuple data lists positioned according to the priority order must be changed (i.e., shifted up by one step). Indeed, there are eight to fifty-six tuples having a relation to one another when a neighbor cell is managed for a hand-off operation. As mentioned above, the conventional method requires that the MMCs be performed repeatedly for the respective tuples, which is burdensome for the operator.

Another disadvantage of the conventional method is that multiple MMC operations must repeated since the MMC according to the prior art is divided into four individual units, i.e., the adding MMC, removing MMC, changing MMC, and display MMC.

SUMMARY OF THE INVENTION

It is therefore an object of the present invention to provide a data management method for simultaneously managing (i.e., changing, adding and removing) a plurality of data via a unified MMC.

In accordance with one aspect of the present invention, a method for managing data in a maintenance system of a digital cellular system includes the steps of requesting, by a unified man machine communication (MMC), changing, adding, removing and display operations of data in one of a single tuple data list and a plurality of tuple data lists; reading data from a table, said table providing one of said single tuple data list and said plurality of tuple data lists; and performing said changing, adding, removing and display operations of said data by using said unified MMC.

This and other objects, features and advantages of the present invention will become apparent from the following detailed description of an illustrative embodiment thereof, which is to be read in connection with the accompanying drawings.

DETAILED DESCRIPTION OF PREFERRED EMBODIMENTS

A preferred embodiment of the present invention will now be described in detail with reference to the accompanying drawings. Although the specific embodiment described herein will be exemplarily defined and described in detail to clarify the subject matter of the present invention, it should be understood, however, that the present invention can be implemented by one of ordinary skill in the art from the following description without unnecessary details. Accordingly, details will not be provided for functions and constructions which are either known and obvious to one of ordinary skill in the art or which are unnecessary to understand, and would merely obscure, the subject matter of the present invention.

Figure 1:
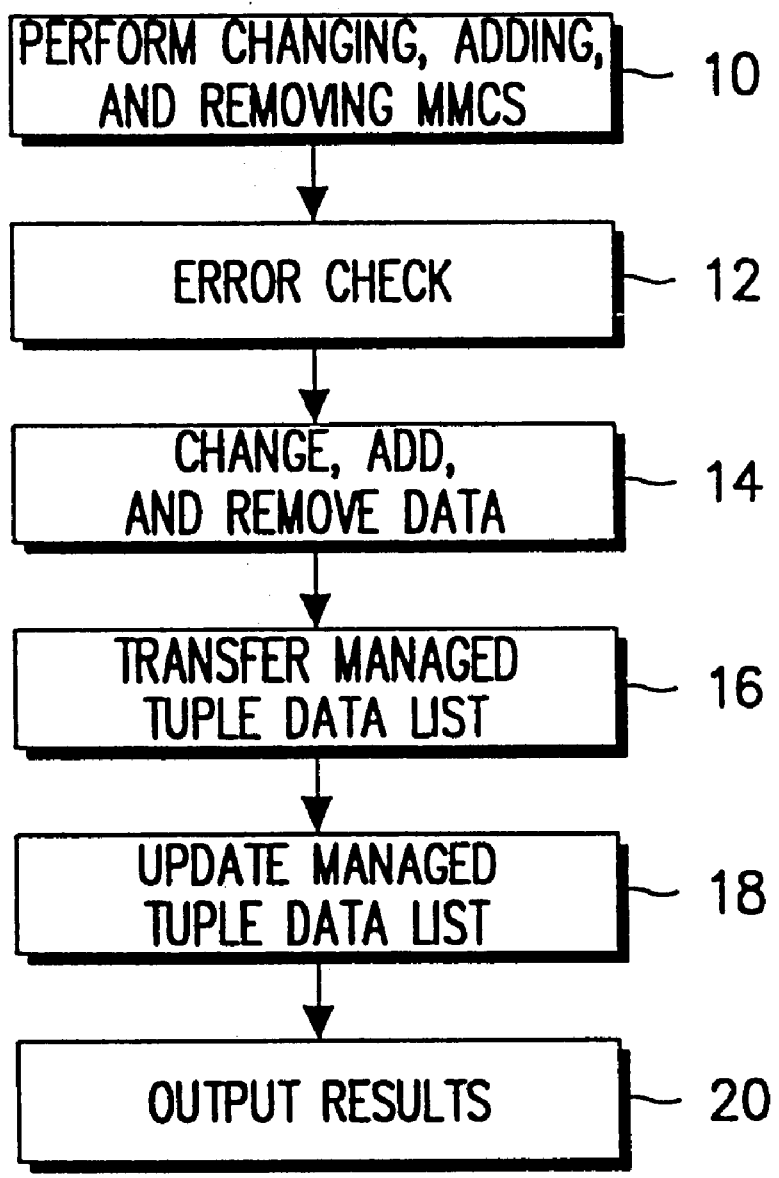
FIG. 1 is a flow chart of a conventional method in a base station manager (BSM) for managing (i.e., changing, adding, and removing) one tuple data list.
Figure 2:
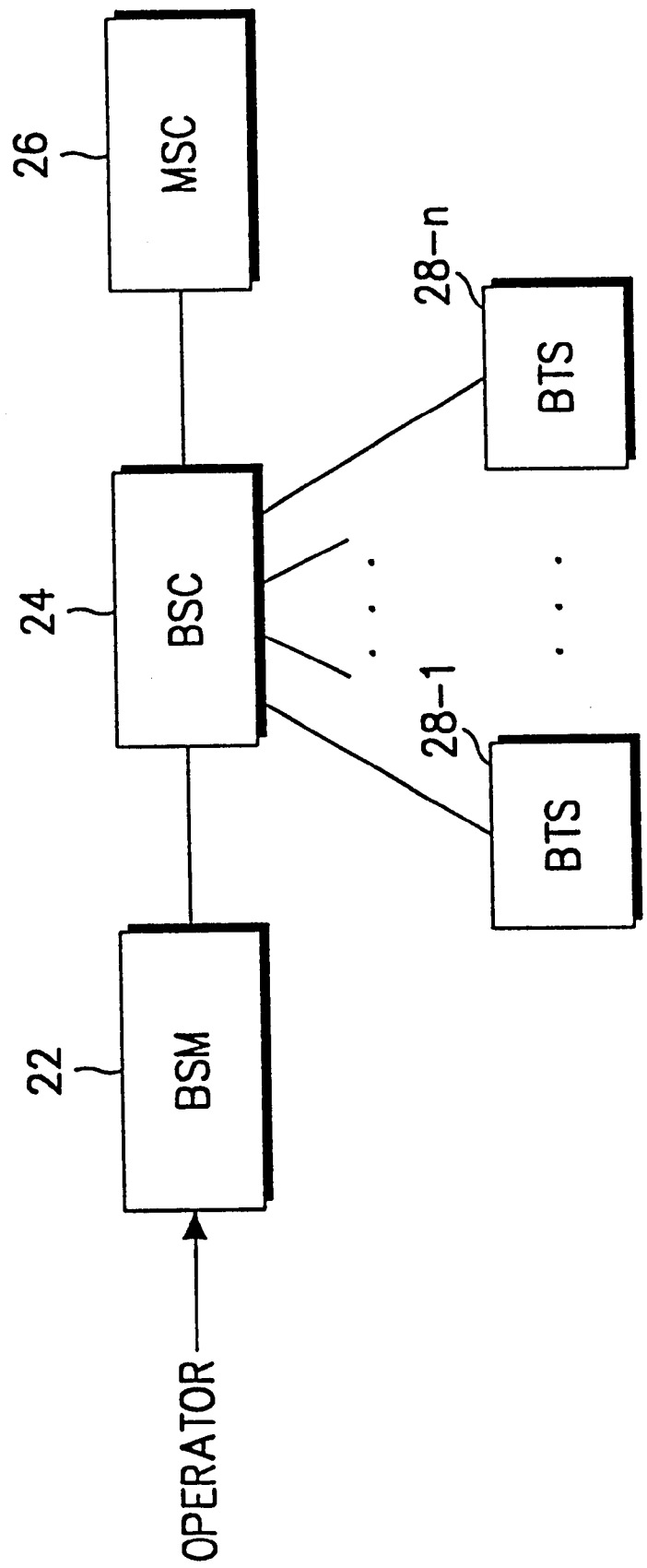
FIG. 2 is a block diagram of a digital cellular system for implementing the a data management method in accordance with the present invention.

Referring now to FIG. 2 a block diagram is shown of a digital cellular system in which a data management method in accordance with the present invention may be implemented. A base station manager (BSM) 22, connected to a base station controller (BSC) 24, performs various general and application functions with respect to a plurality of base station transceiver subsystems (BTSs) (denoted by 28-1 to 28-n) and the base station controller (BSC) 24. The general functions performed by the BSM 22 include data communication, data management, operator matching, and BSM system drive functions. The application functions performed by the BSM 22 include an operating and a maintenance function. The operating function provides the plurality of BTSs (28-1 to 28-n) with a system loading function, a structure management function, and a performance management function. The system loading function provides execution code and data for the respective blocks in the BTSs. A configuration management function is also provided for managing and changing the configuration and operation parameters of the respective BTSs.

As shown in FIG. 2, the BSC 24, which is connected to the plurality of BTSs (28-1 to 28-n) and a mobile switching center (MSC) 26, controls the overall communication between the BTSs (28-1 to 28-n). The MSC 26 performs a switching operation for mobile terminals (not shown).

Figure 3:
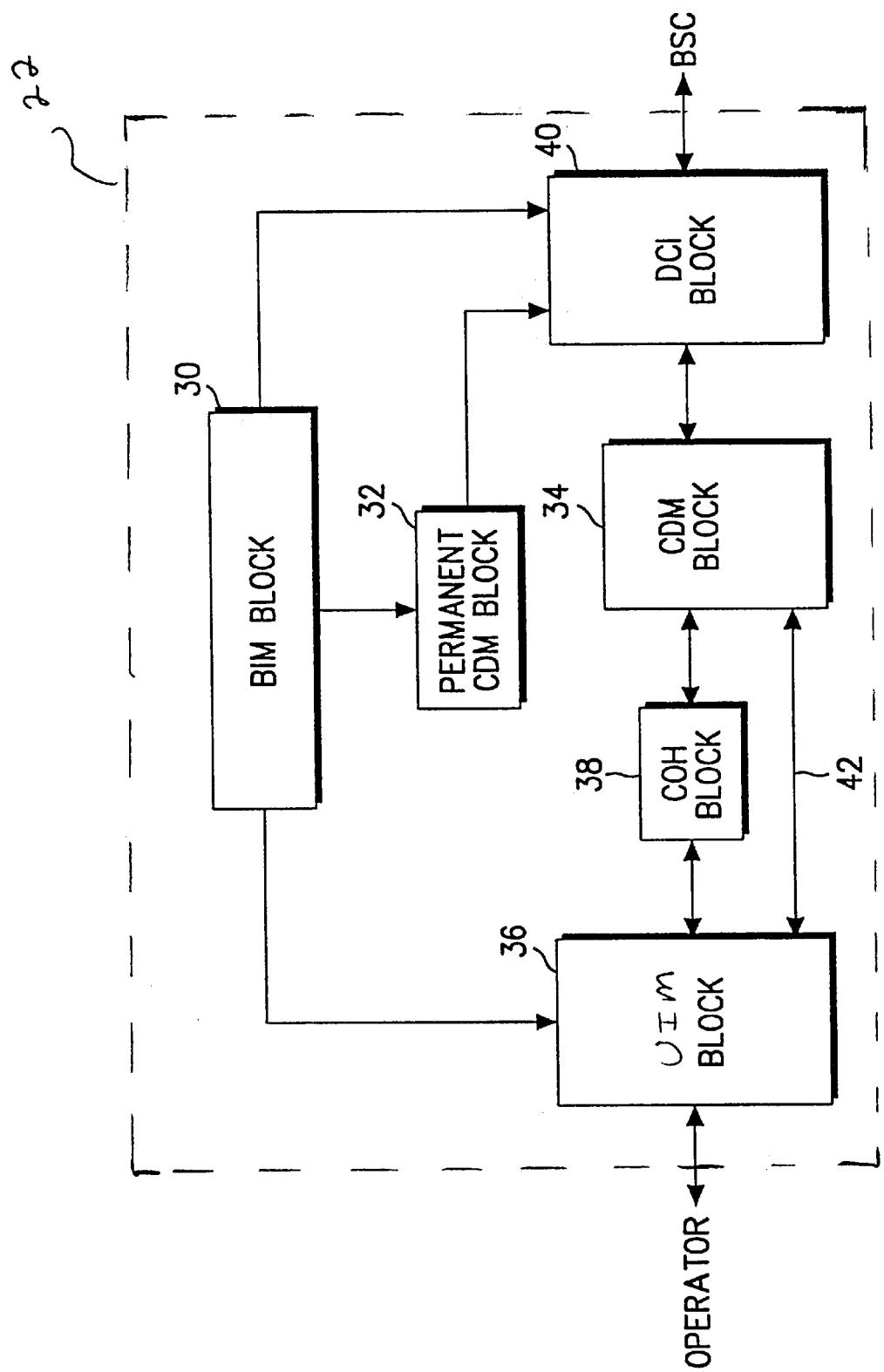
FIG. 3 is a block diagram of a base station manager shown in FIG. 2, for implementing the a data management method in accordance with the present invention.

Referring now to FIG. 3, a block diagram is shown of the (BSM) 22 in FIG. 2. A BIM (BSM initialization and maintenance) block 30 is provided for executing various function blocks covering the general function and the operator matching function during BSM initialization. The BIM periodically determines whether or not the respective function blocks are operating normally and will recover the function block that operates abnormally. A permanent CDM (configuration data manager) block 32, connected to the BIM block 30, is provided for managing the configuration data under the control of the BIM block 30. When necessary, the permanent CDM block 32 may operate without a request from the operator. Further, the permanent CDM block 32 is monitored by the BIM block 30.

A CDM block 34 is provided for performing the entire data management configuration covered by the operation of the BSM 22, BSC 24 and the BTSs 28-1 to 28-n. Specifically, the CDM block 34 performs a data changing function and an operation data reading function for all the configuration data. A UIM (user interface manager) block 36 performs all the window-related functions such as (1) creating and removing windows and event management, (2) outputting information related to status, problems, errors and statistics of the system in simple and logical graphic information, and (3) managing events from the operator. A COH (command handler) block 38 performs sentence structure and meaning analysis function for input commands, as well as an execution control function. In response to an error-free command, the CDM block 34 transfers its output data to the UIM block 36. A DCI (data communication interface) block 40 provides a management information transmission/reception path between the function blocks in the BSM 22 and all the subsystems in the BTSs 28-1 to 28-n. The CDM blozk 34 is connected to the UIM block 36 via a transmission path 42 through which the configuration management data is transmitted in accordance with the present invention.

The BSM 22, the BSC 24, and the BTSs 28-1 to 28-n perform the operation function with reference to program loaded data (PLD) which is the operation data. As shown in FIG. 3, the operator performs the operation function of the BSM 22 via a graphic user interface (GUI) (not specifically shown) in the UIM block 36. In accordance with the present invention, the BSM 22 manages the data based on a command by the operator, and then outputs the data to the BSC 24. In accordance with a preferred embodiment of the present invention, all the MMCs are unified into one MMC, and the data configuration is managed by the unit of a plurality of tuple data lists.

As noted above, one of the problems associated with the conventional method of data management is that data is managed by the field, thereby requiring that each field be independently managed when changing the data of a whole tuple. Specifically, the field units are individually managed so as to determine whether a particular value in a specified field is added, changed or removed. As a result, the adding, changing, and removing MMCs must be managed separately. The present invention provides a solution to this problem by managing the data by the tuple, which allows the fields to be determined in accordance with the order of the tuples. Thus, it is unnecessary to separately manage the fields. Further, since the corresponding tuple is managed, it is possible to unify the individual MMCs for adding, changing and removing into one MMC.

The data management method of the present invention remedies the problem of having to repeat the MMC as mentioned above. Conventionally, when changing the data by the unit of the tuple data lists, the data must be checked via the display MMC and the details of the data change must be checked. Thereafter, the data must be changed again via the changing MMC, and the change must be checked again. In the present invention, however, the PLD data is read by using a library format structure. If an operator MMC is continuously active, the data reading operation is always available so that it is unnecessary to drive a separate MMC. Further, the MMC operations for changing the PLD data can be unified into one MMC thereby solving the conventional problem of having to repeat the MMC operations.

In addition, the present invention provides a solution for burdensome task associated with the conventional data management method of having to repeat the MMCs with respect to each of the fifty-six tuples. However, in accordance with the present invention, a tuple having data can always be changed, and a plurality of tuples can be managed (i.e., changed, added, and removed) simultaneously. Accordingly, when the tuples have a relation to one another, the operation and management may easily be attained.

The problem associated with the conventional method of having individual MMCs is also remedied by the present invention. Basically, a configuration MMC may be one of a display PLD and a changing PLD. However, in light of the features of the MMC, the MMC is separately managed into the adding, changing and removing MMCs. That is, even in case of null data, the PLD has a manageable data space into which data can be added. In other words, the data changing, adding and removing operations all have an influence on the PLD. Accordingly, by managing the data based on the tuple, the PLD can be managed by one MMC in accordance with the present invention.

In accordance with the data management method of the present invention, the CDM block 34 should be interlocked with the UIM block 36, so as to allow the operator to monitor the procedure of the present invention via the GUI interface. The present invention considers the following functions.

First, in order for the operator to selectively view the data, a library which can group the relevant data into a predetermined format and transfer it to the UIM block 36 is needed. The operator can always use the library to see the data via a graphic button provided by the UIM block 36.

Second, when the data is managed by the tuple unit and the tuples have mutually interlocked, both a function for managing the data for a plurality of tuples and a function for determining whether or not the data has be effectively managed via the user interface should be considered.

Third, a function for transferring the data format managed by the tuple unit to the BSC 24 and the BTSs 28-1 to 28-n should be considered.

Fourth, when the above first, second and third functions have no problems, a function for accurately updating the data into the PLD file should be considered.

In the following example, the data format transferred to the CDM block 34 from the UIM block 36 according to the present invention is shown. The following library format structures are designed to cover all the details required by the display.

```
Structure (1)
typedef    struct {
              int    DATA1 ;
              int    DATA2 ;
              int    DATA3 ;
              int    DATA4 ;
              int    DATA5 ;
} Tuple_Information ;
Structure (2)
typedef    struct {
              int    KEY1 ;
              int    KEY2 ;
              int    KEY3 ;
              int    NUMBER_OF_TUPLE ;
              int    Tuple_Information
tuple_MAX_NUMBER_OF_TUPLE ;
}    Tuple Request ;
Structure (3)
typedef union    {
Tuple_Request  Send_Data_List ;
}Data_List_Union ;
Structure (4)
typedef struct    {
              int    _cmd_id ;
              Data_List_Union    _data_List ;
} Uimx_Send_to_Cdmx ;
```

In Structure (1) above, DATA1 to DATA5 represent fields into which desired information are stored respectively. In Structure (2) above, KEY1 to KEY3 represent key values for designating data positions, and NUMBER_OF_TUPLE represents a variable for expressing the number of actual effective data. Further, MAX_NUMBER_OF_TUPLE represents a maximum number of tuples which are read during execution of the unified MMC. Structures (1) and (2) represent the library format structures used when reading the PLD data.

Figure 5:
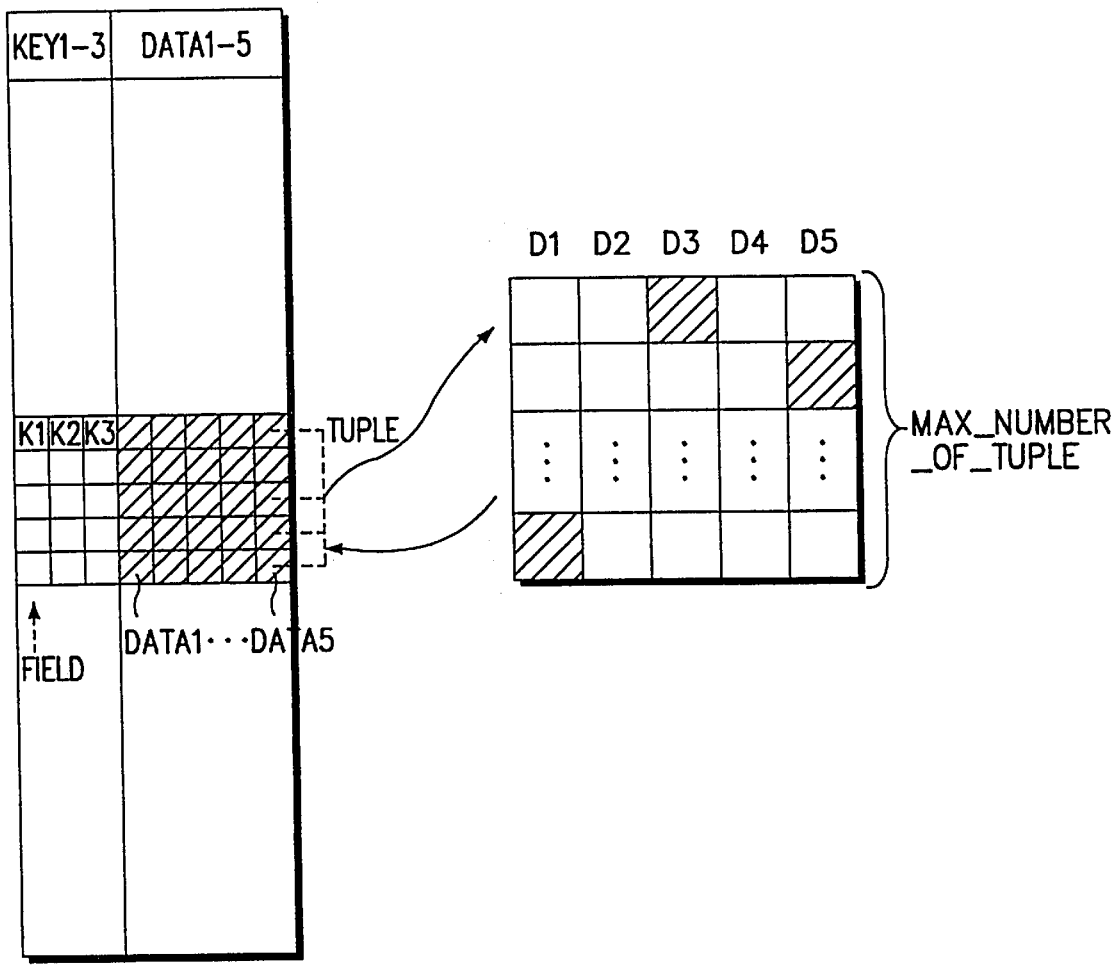
FIG. 5 is a data table illustrating a configuration for a reading library in accordance with the present invention.

Referring now to FIG. 5, a data table illustrating a configuration for a reading library in accordance with the present invention is shown for explaining Structures (1) and (2). Specifically, the drawing illustrates an example of a schematic structure of the actual PLD data. In FIG. 5, K1–K3 represent key values for reading designated data and D1–D5 represent the data which can be searched via the key values K1–K3. Further, tuples within the range MAX_NUMBER_OF_TUPLE corresponding to the key values refers to a tuple list reformed in the form of a table. If the operator inputs the key values K1–K3 corresponding to the data desired to be changed, removed or added via the unified MMC, the library with Structures (1) and (2) reads the tuples within the range MAX_NUMBER_OF_TUPLE corresponding to the key values and displays the data areas of the tuples within the range on the GUI screen, as shown in FIG. 5. The operator may then collectively manage (change, add and remove) predetermined data of a specified tuple on the GUI screen.

The managed data is applied to Structures (1) and (2) and then transferred to the CDM block 34 from the UIM block 36 in the format of the above Structures (3) and (4). The CDM block 34 reads _CMD_ID from the data transferred from the UIM block 36. From the transferred data, it is possible to determine which command the operator desires to use and the format of the structure. For example, data may be read by the Data_List_Union type since the format of Structures (3) and (4) include a Data_List_Union type.

A reading library having such a structure may be employed for dual purposes. Specifically, the reading library may be used as a library for calling the existing data via the GUI to see the data. The reading library may also be used when reading the PLD data so as to compare it with the existing data.

Figure 4:
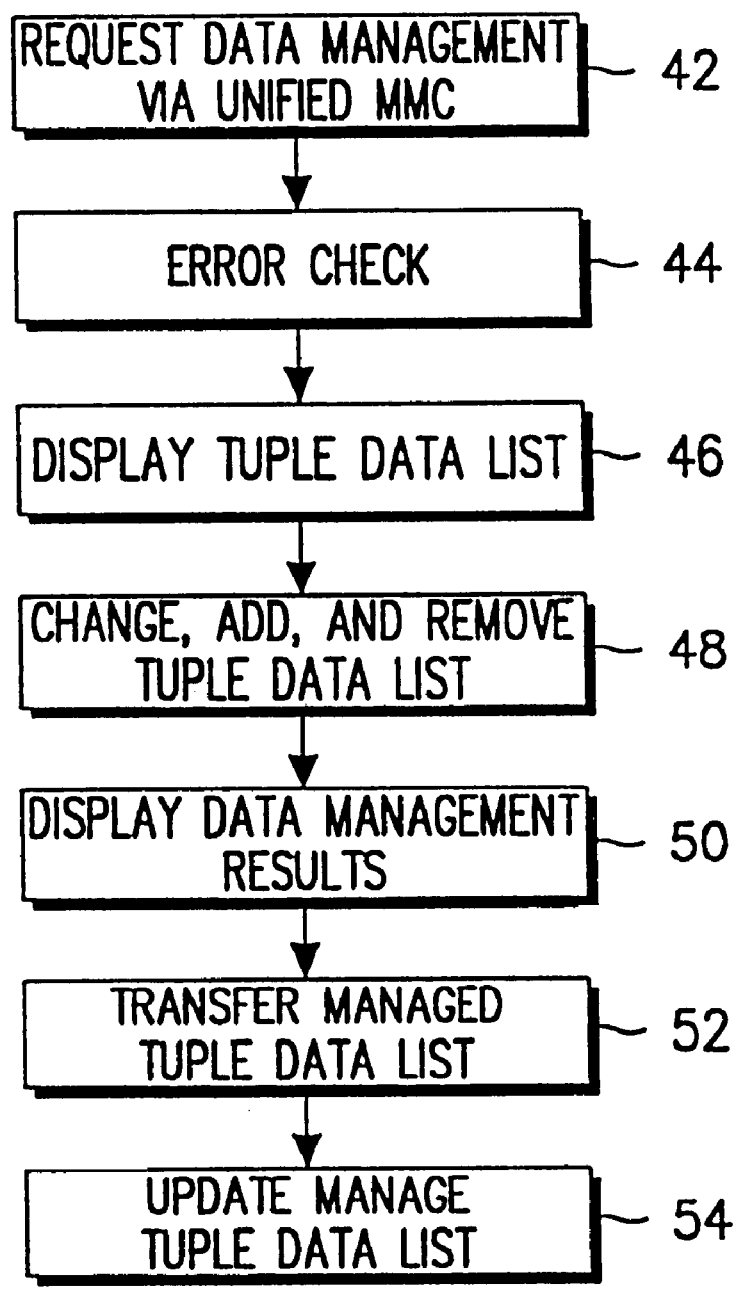
FIG. 4 is a flow chart illustrating a method for data management in a BSM in accordance with present invention.

Referring now to FIG. 4, a flow chart for managing a data configuration via the BSM in accordance with present invention is shown. After the operator makes a request for changing, adding and removing the data in the tuples via the unified MMC (step 42), the BSM 22 performs a key error check operation (step 44). When the key error check is completed, the BSM 22 reads the requested tuple data lists by using the library to display it on the GUI screen (step 46). Next, the BSM 22 changes, adds, and removes the corresponding data of the tuple data lists via the user interface (step 48). When the data is changed, added or removed, the incoming data is compared with the existing data via the library described above so as to complete the procedure if the data has not been changed. The BSM 22 then displays the results of the data changing, adding and removing operations on the GUI screen (step 50). Next, the BSM 22 transfers the managed tuple data lists to the BSC 24 and the BTSs 28-1 to 28-n (step 52). Upon receiving an acknowledge signal from the BSC 24 and the BTSs 28-1 to 28-n, the BSM 22 updates the managed tuple data lists into the database (step 54).

As demonstrated above, the present invention offers convenience to the operator. Particularly, the data management method of the present invention is extremely useful when managing various data having a close relation to one another. The functions according to the present invention are used when operating the entire BSM.

Although an illustrative embodiment of the present invention has been described herein with reference to the accompanying drawings, it is to be understood that the invention is not limited to that precise embodiment, and that various other changes and modifications may be affected therein by one skilled in the art without departing from the true scope or spirit of the invention.

What is claimed is:

1. A method of managing data in a maintenance system of a digital cellular system, comprising the steps of:

reading related data from operation data;

structuring said data by tuples in a form of a table by using a reading library format structure, said reading library format structure comprising
a first variable value representing a number of actual tuples, and
a second variable value representing a number of said tuples to be read; and managing and transferring said structured data.

2. The method of claim 1, wherein said operation data is program loaded data.

3. The method of claim 1, wherein said reading library format structure comprises:

a plurality of key values for reading designated data positions; and a plurality of data fields for storing data in said data positions.

4. The method as recited in claim 3, wherein the step of structuring said data further comprises the steps of:

creating a reading data structure comprising said key values with corresponding said data fields; and creating a request data structure comprising requested key values, and the first and second variables.

5. The method as recited in claim 4, wherein the step of structuring said data further comprises the steps of:

creating a command data structure for managing and transferring said data using the data structure and the request data structure.

6. A device for managing data in a maintenance system of a digital cellular system, comprising:

means for creating a reading data structure comprising key values with corresponding data fields;

means for creating a request data structure comprising requested key values, a first variable value for expressing a number of actual tuples, and a second variable value for representing a number of said tuples to be read;

means for creating a command data structure to manage and transfer said data using the reading data structure and the request data structure;

means for requesting, by a single man machine communication (MMC), at least one of changing, adding, removing and displaying operations of data in one of a single tuple data list and a plurality of tuple data lists;

means for reading data from a table, said table providing one of said single tuple data list and said plurality of tuple data lists; and means for performing said at least one of changing, adding, removing and display operations of said data by using a single MMC.

* * * * *